United States Patent
Chang et al.

(10) Patent No.: US 9,065,691 B2
(45) Date of Patent: Jun. 23, 2015

(54) SLICED TRANSMITTER FRONT-END

(75) Inventors: Hsiang-Hui Chang, Miaoli County (TW); Augusto Marques, Moscavide (PT); Li-Shin Lai, Taipei (TW); Chih-Hao Sun, New Taipei (TW); George Chien, Saratoga, CA (US)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 272 days.

(21) Appl. No.: 13/610,912

(22) Filed: Sep. 12, 2012

(65) Prior Publication Data

US 2013/0142274 A1 Jun. 6, 2013

Related U.S. Application Data (60) Provisional application No. 61/550,633, filed on Oct. 24, 2011.

(51) Int. Cl.
*H04L 25/02* (2006.01)
*H04L 27/00* (2006.01)

(52) U.S. Cl.
CPC ............ *H04L 25/02* (2013.01); *H04L 27/0002* (2013.01)

(58) Field of Classification Search
CPC  H04L 27/0002; H04L 25/02; H04B 10/2931; H03F 3/211; H03G 3/3042
USPC ................. 375/295, 297; 330/295; 455/127.1–127.3
See application file for complete search history.

(56) References Cited

U.S. PATENT DOCUMENTS

2003/0030479 A1* 2/2003 Holdenried et al. .......... 327/350

FOREIGN PATENT DOCUMENTS

| CN | 1067143 | A | 12/1992 |
|---|---|---|---|
| CN | 1400739 | A | 3/2003 |
| CN | 1549446 | A | 11/2004 |
| CN | 1679244 | A | 10/2005 |
| CN | 101426111 | A | 5/2009 |
| CN | 101461134 | A | 6/2009 |
| CN | 102201822 | A | 9/2011 |
| TW | 216471 | A | 11/1993 |
| TW | 428852 | | 4/2001 |

OTHER PUBLICATIONS

Christopher Jones et al., "Direct-Conversion WCDMA Transmitter with-163dBc/Hz Noise at 190MHz Offset", Feb. 13, 2007, pp. 3-5, ISSCC 2007 / Session 19 / Cellular and Multi-Mode Transceivers / 19.1.
T. Montalvo et al., "A Wireless Transceiver with Integrated Data Converters for 802.11a/b/g Access Points", Feb. 7, 2006, pp. 1-10, ISSCC 2006 / Session 20 / WLAN/WPAN / 20.3.

\* cited by examiner

*Primary Examiner* — Curtis Odom
(74) *Attorney, Agent, or Firm* — Winston Hsu; Scott Margo (57) ABSTRACT

An embodiment of the invention provides a sliced transmitter front-end (TX FE). The sliced TX FE includes first TX FE slices and a second TX FE slice that are connected in parallel. As a whole the first TX FE slices contributes a high-gain section to a superimposed gain range of the sliced TX FE. The second TX FE slice has a gain range that constitutes a low-gain section of the superimposed gain range of the sliced TX FE. A minimum gain of the gain range of the second TX FE slice is smaller than a minimum gain of the high-gain section.

6 Claims, 8 Drawing Sheets

| Gain level | Number of enabled first TX FE slice(s) | Number of enabled PGA unit(s) in each enabled first TX FE slice | Second TX FE slice enabled? | Gain step (dB) | Gain step sum (dB) |
|---|---|---|---|---|---|
| 1 | 8 | 8 | No | 0.00 | 0.00 |
| 2 | 8 | 7 | No | -1.16 | -1.16 |
| 3 | 8 | 6 | No | -1.34 | -2.50 |
| 4 | 8 | 5 | No | -1.58 | -4.08 |
| 5 | 8 | 4 | No | -1.94 | -6.02 |
| 6 | 4 | 7 | No | -1.16 | -7.18 |
| 7 | 4 | 6 | No | -1.34 | -8.52 |
| 8 | 4 | 4 | No | -3.52 | -12.04 |
| 9 | 2 | 4 | No | -6.02 | -18.06 |
| 10 | 2 | 2 | No | -6.02 | -24.08 |
| 11 | 1 | 2 | No | -6.02 | -30.10 |
| 12 | 1 | 1 | No | -6.02 | -36.12 |
| 13 | 1 | 1 | No | -6.02 | -42.14 |
| 14 | 1 | 1 | No | -6.02 | -48.16 |
| 15 | 1 | 1 | No | -6.02 | -54.18 |
| 16 | 0 | 0 | Yes | -6.00 | -60.18 |
| 17 | 0 | 0 | Yes | -6.00 | -66.18 |
| 18 | 0 | 0 | Yes | -6.00 | -72.18 |
| 19 | 0 | 0 | Yes | -6.00 | -78.18 |

SLICED TRANSMITTER FRONT-END

CROSS REFERENCE TO RELATED APPLICATIONS

This application claims the benefit of U.S. Provisional Application No. 61/550,633, filed on Oct. 24, 2011 and incorporated herein by reference.

BACKGROUND

1. Technical Field

The invention relates generally to a transmitter front-end, and more particularly, to a transmitter front-end with a sliced configuration.

2. Related Art

A transmitter front-end (TX FE) is an analog circuit within a transmitter/transceiver and lies between a digital circuit and an antenna of the transmitter/transceiver. In brief, the digital circuit generates a digital signal that is then converted by a digital-to-analog converter (DAC) into a baseband signal. The TX FE includes a local oscillator (LO) for generating a carrier signal, a mixer for mixing the baseband signal with the carrier signal to generate a radio frequency (RF) signal, and a gain stage for amplifying the RF signal. The amplified RF signal is then sent to, either directly or indirectly, the antenna for transmission.

A TX FE is sometimes designed to provide a large dynamic range. However, such a TX FE may face several problems. For example, it may suffer from noise degradation especially when it's providing a high gain. In addition, it may be unable to maintain its linearity at different gain levels. Furthermore, it may suffer from the so called "LO leakage" problem especially when it's providing a low gain. Moreover, it may be unable to reduce much of its power consumption even when it's providing a low gain.

SUMMARY

One of the objectives of the invention is to provide a transmitter front-end that has a large dynamic range and is alleviated from the aforementioned problems.

An embodiment of the invention provides a sliced transmitter front-end (TX FE). The sliced TX FE includes a plurality of first TX FE slices and a second TX FE slice that are connected in parallel. As a whole the first TX FE slices contributes a high-gain section to a superimposed gain range of the sliced TX FE. The second TX FE slice has a gain range that constitutes a low-gain section of the superimposed gain range of the sliced TX FE. A minimum gain of the gain range of the second TX FE slice is smaller than a minimum gain of the high-gain section.

An embodiment of the invention provides a method for operating a sliced TX FE. The sliced TX FE has a plurality of first TX FE slices and a second TX FE slice connected in parallel. The method includes: in a first mode, enabling the first TX FE slices and disabling the second TX FE slice; and in a second mode, disabling the first TX FE slices and enabling the second TX FE slice. A minimum gain of a low-gain section contributed by the second TX FE slice is smaller than a minimum gain of a high-gain section contributed by the first TX FE slices.

An embodiment of the invention provides a sliced TX FE. The sliced TX FE includes a plurality of TX FE slices connected in parallel. Each of the TX FE slices includes a mixer, a local oscillator connected to a carrier input end of the mixer, and a programmable gain amplifier (PGA) connected to a signal output end of the mixer.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

DETAILED DESCRIPTION

Figure 1:
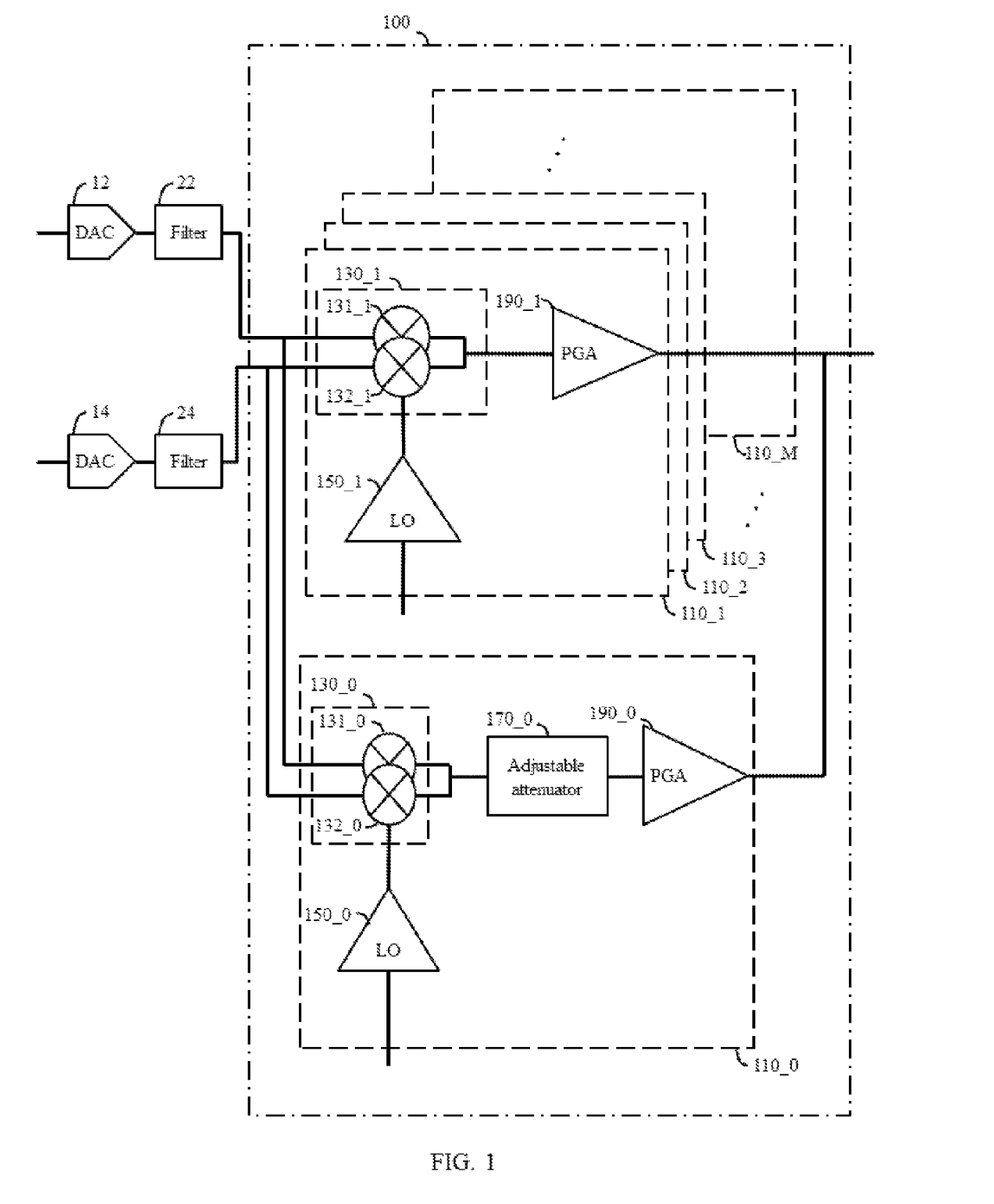
FIG. 1 shows a simplified block diagram of a sliced transmitter front-end (TX FE) according to an embodiment of the invention.

FIG. 1 shows a simplified block diagram of a sliced transmitter front-end (TX FE) 100 according to an embodiment of the invention. This sliced TX FE 100 can be included in a transmitter/transceiver and be placed between a digital circuit and an antenna of the transmitter/transceiver. Some digital-to-analog convertors (DACs) and some filters, such as a DAC 12, a DAC 14, a filter 22, and a filter 24 shown in FIG. 1, may serve as an intermediary circuit between the digital circuit and the TX FE 100.

In this embodiment, the sliced TX FE 100 includes M first TX FE slices 110_1~110_M and a second TX FE slice 110_0, where M is an integer larger than 1. The M first TX FE slices 110_1~110_M are connected in parallel and can be substantially identical to each other. Taking the first TX FE slice 110_K as an example, where K is an integer between 1 and M, it includes a mixer 130_K, a local oscillator (LO) 150_K, and a gain stage consisting of a programmable gain amplifier (PGA) 190_K. The mixer 130_K has at least one mixer unit, e.g. two mixer units 131_K and 132_K operate under different phases. The mixer units 131_K and 132_K may be passive ones, each has a signal input end, a carrier input end, and a signal output end at its left side, bottom side, and right side, respectively. The PGA 190_K may have a plurality of PGA units and may enable any number of the PGA units thereof while disable the other PGA units. For example, a PGA unit is enabled if it's performing signal amplification and is disabled if it's turned off. Because the first TX FE slices 110_1~110_M and the PGA units thereof can be enabled or disabled independently, as a whole the first TX FE slices 110_1~110_M can provide a high-gain section of a plurality of first gain levels.

Like each of the first TX FE slices 110_1~110_M, the second TX FE slice 110_0 also includes a mixer 130_0, a LO 150_0, and a gain stage consisting of a PGA 190_0. The mixer 130_0 has at least one mixer unit, e.g. two mixer units 131_0 and 132_0 operate under different phases. The mixer units 131_0 and 132_0 may be passive ones, each has a signal input end, a carrier input end, and a signal output end at its left side, bottom side, and right side, respectively. The PGA 190_0 may have a plurality of PGA units and may enable any number of the PGA units thereof while disable the other PGA units. Unlike the first TX FE slices 110_1~110_M, the second TX FE slice 110_0 further includes another gain stage consisting of an adjustable attenuator 170_0. The adjustable attenuator 170_0 is capable of providing a negative gain on the decibel scale. It has a signal input end and s signal output end at its left side and right side, respectively. With the adjustable attenuator 170_0 and the PGA 190_0, the second TX FE slice 110_0 can provide a low-gain section of a plurality of second gain levels. The inclusion of the adjustable attenuator 170_0 causes the minimum gain of the low-gain section to be smaller than the minimum gain of the high-gain section. As a result, at least one of the second gain levels is smaller than all of the first gain levels. For example, the adjustable attenuator 170_0 can be a capacitive divider or an input stage with adjustable gain of the PGA 190_0.

In this embodiment, the signal input ends of the mixer units 131_0~131_M are connected to the filter 22 to receive a first baseband signal. The signal input ends of the mixer units 132_0~132_M are connected the filter 24 to receive a second baseband signal. The initial digital versions of these baseband signals are generated by the digital circuit of the transmitter/transceiver. The signal output ends of the PGAs 190_0~190_M are connected to an output end of the sliced TX FE 100 to provide an amplified signal to, either directly or indirectly, the antenna of the transmitter/transceiver for transmission.

The sliced TX FE 100 of this embodiment has a superimposed gain range. The superimposed gain range includes the high-gain section contributed by the first TX FE slices 110_1~110_M as a whole, and the low-gain section contributed by the second TX FE slice 110_0. For example, if the first gain range provided by each of the first TX FE slices 110_1~110_M is between X1 dBm and Y1 dBm, the aforementioned high-gain section should be between X1 dBm and Y1' dBm, where Y1' is larger than Y1. If the second gain range of the second TX FE slices 110_0 is between X2 dBm and Y2 dBm, the low-gain section is also between X2 dBm and Y2 dBm.

Figure 2:
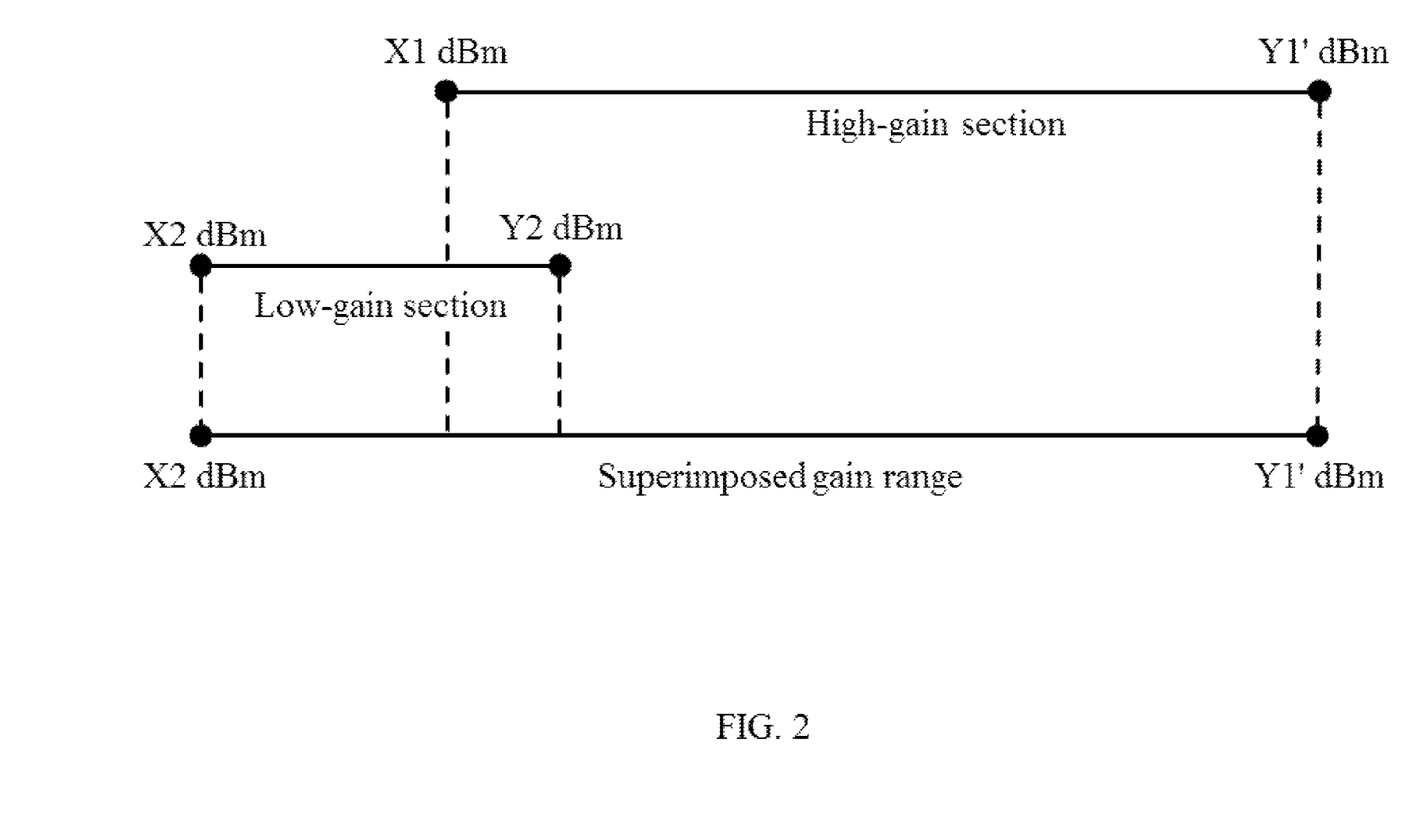
FIG. 2 shows a schematic diagram illustrating the relationship between a high-gain section, a low-gain section, and a superimposed gain range of the sliced TX FE of FIG. 1.

As mentioned above, the inclusion of the adjustable attenuator 170_0 causes the minimum gain of X2 dBm provided by the second TX FE slice 110_0 to be smaller than the minimum gain of X1 dBm provided by the first TX FE slices 110_1~110_M. Furthermore, if the maximum gain of Y2 dBm of the low-gain section is larger than the minimum gain of X1 dBm of the high-gain section, the two sections will share an overlapping section between X1 dBm and Y2 dBm. FIG. 2 shows a schematic diagram illustrating the relationship between the high-gain section, the low-gain section, and the superimposed gain range. If the maximum gain of Y2 dBm of the low-gain section is equal to or smaller than the minimum gain of X1 dBm of the high-gain section, there will be only a overlapping gain of X1=Y2 dBm or no overlapping at all between the high-gain and low-gain sections.

Figure 3:
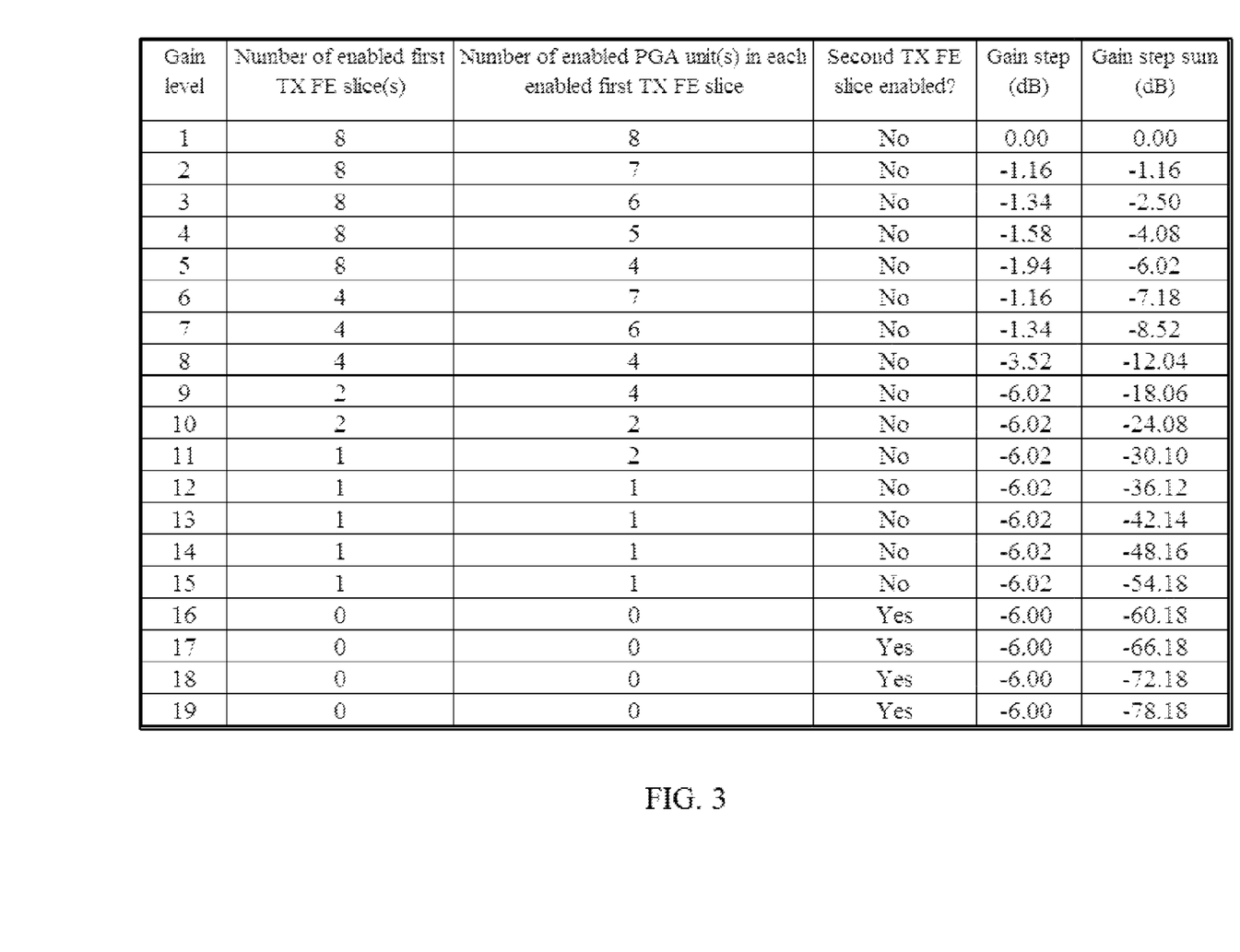
FIG. 3 shows a table listing some exemplary gain levels of the sliced TX FE of FIG. 1.

FIG. 3 shows a table listing some exemplary gain levels of the sliced TX FE 100, based on the assumption that M is equal to 8 and each of the PGAs 190_0~190_8 has 8 PGA units. In this example, the sliced TX FE 100 has at least 19 discrete gain levels. Gain levels 1~15 may be non-exclusive members of the aforementioned first gain levels. The sliced TX FE 100 may be in a first mode to provide gain levels 1~5, and in a third mode to provide gain levels 6~15. In the first mode, all the first TX FE slices 110_1~110_M are enabled and the second TX FE slice 110_0 is disabled. In the third mode, a group of the first TX FE slices are enabled while the other group of the first TX FE slices and the second TX FE slice 110_0 are disabled. A TX FE slice is enabled if it's generating RF signals based on the baseband signals it receives from the filters 22 and 24. On the other hand, a TX FE slice is disabled if it's turned off.

When the sliced TX FE 100 is in the first mode or the third mode and there are more than one first TX FE slices enabled, the sliced TX FE 100 may enable the same numbers of PGA units in the enabled first TX FE slices. For example, at gain level 1, the sliced TX FE 100 enables 8 PGA units in each of the 8 first TX FE slices; at gain level 2, the sliced TX FE 100 enables 7 PGA units in each of the 8 enabled first TX FE slices; . . . ; at gain level 6, the sliced TX FE 100 enables 7 PGA units in each of the 4 enabled first TX FE slices; at gain level 7, the sliced TX FE 100 enables 6 PGA units in each of the 4 enabled first TX FE slices; . . . ; at gain level 10, the sliced TX FE 100 enables 2 PGA units in each of the 2 enabled first TX FE slices.

Gain levels 16~19 may be non-exclusive members of the aforementioned second gain levels, and the sliced TX FE 100 is in a second mode to provide any of these 4 gain levels. In the second mode, the first TX FE slices 110_1~110_M are all disabled and only the second TX FE slice 110_0 is enabled.

Figure 4:
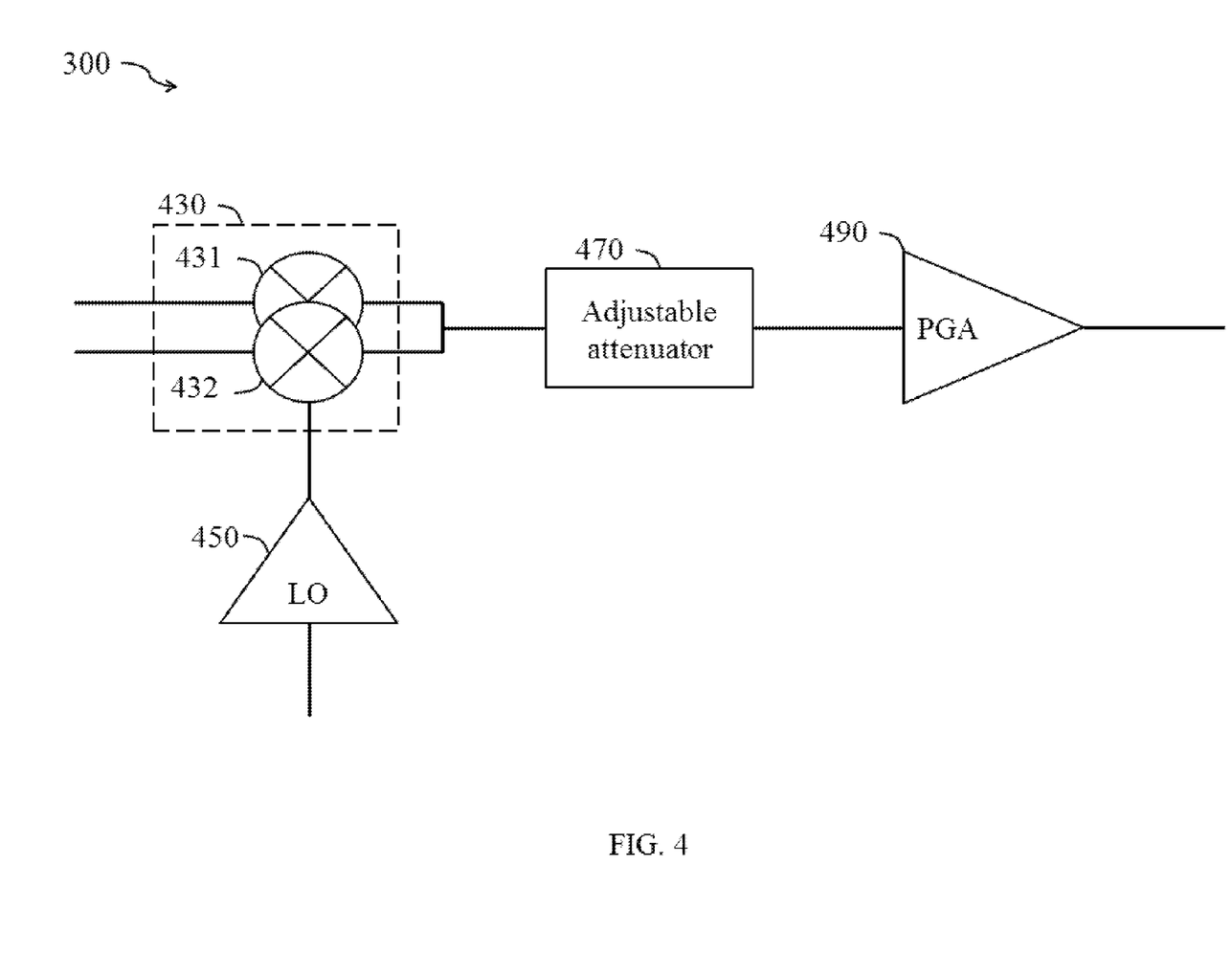
FIG. 4 shows a simplified block diagram of an unsliced TX FE.

FIG. 4 shows a simplified block diagram of a TX FE 400 having a dynamic range comparable with that of the sliced TX FE 100 but without a sliced configuration. One of ordinary skills in the related art can better and more easily understand the advantages of the sliced TX FE 100 by comparing it with the unsliced TX FE 400.

The unsliced TX FE 400 is similar to the second TX FE slice 110_0 in that the former also includes a mixer 430, a LO 450, a first gain stage consisting of an adjustable attenuator 470, and a second gain stage consisting of a PGA 490. Furthermore, the mixer 430 is like the mixer 130_0 in that the former also includes two mixer units 431 and 432. To let the sliced TX FE 100 and the unsliced TX FE 400 have comparable dynamic ranges, each of the mixers 130_0~130_M can be roughly 1/M of the scale of the mixer 430, each of the LOs 150_0~150_M can be roughly 1/M of the scale of the LO 450, each of the PGAs 190_0~190_M can be roughly 1/M of the scale of the PGA 490, and the adjustable attenuator 170_0 can be roughly 1/M of the scale of the adjustable attenuator 470. Furthermore, if each of the PGAs 190_0~190_M includes N PGA units, the PGA 490 can include (M*N) PGA units, where N is an integer larger than 1.

The following comparison between the sliced TX FE 100 and the unsliced TX FE 400 is based on the assumptions that they both have dynamic ranges of roughly 78 dB, and both M and N are 8. Under these assumptions, the PGA 490 includes 64 PGA units, and each of the PGAs 190_0~190_M includes 8 PGA units.

Unlike the unsliced TX FE 400 and the second TX FE slice 110_0, none of the first TX FE slices 110_1~110_8 includes an adjustable attenuator, which can be a potential source of signal-to-noise ratio (SNR) degradation. Therefore, unlike the unsliced TX FE 400, the sliced TX FE 100 is relatively alleviated from SNR degradation when it operates at any of the gain levels 1~15 shown in FIG. 3 because no adjustable attenuator is used at these gain levels. Because noise is relatively more negligible when the sliced TX FE 100 operates at a low gain, the fact that the adjustable attenuator 170_0 is enabled when the sliced TX FE 100 operates at any of the gain levels 16~19 shown in FIG. 3 will not result in an unacceptable noise problem.

Furthermore, each of the mixers 130_0~130_8 may be a passive mixer and have great linearity. Because of this, the TX FE slices 110_0~110_8 need not share a single large PGA 490 but instead may have sliced PGA 190_0~190_8. Unlike the mixer 430 that is loaded with (or faces) 64 PGA units and a wide range of gain, each of the mixers 130_0~130_8 is loaded with (or faces) only 8 PGA units and a relatively narrower gain range. As a result, the sliced TX FE 100 as a whole can have a better linearity than the unsliced TX FE 400.

In addition, each of the LOs 150_0~150_8 is ⅛ of the scale of the LO 450. Only 4 of the LOs 150_0~150_8 are enabled when the sliced TX FE 100 operates at the gain levels 6~8 shown in FIG. 3; only 2 of the LOs 150_0~150_8 are enabled when the sliced TX FE 100 operates at the gain levels 9~10; only 1 of the LOs 150_0~150_8 is enabled when the sliced TX FE 100 operates at the gain levels 11~19. In other words, at gain levels 6~19, at least 5 of the LOs 150_0~150_8 are disabled and hence will not cause LO leakage. As a result, the sliced TX FE 100's LO leakage problem can be reduced with its output power level. In contrast, the LO 450 is always on, regardless of whether the unsliced TX FE 400 operates at its maximum or minimum gain level. As a result, the unsliced TX FE 400 may face a severe LO leakage problem especially when it operates at a low gain level.

Moreover, some of the TX FE slices 110_0~110_8 can be disabled to reduce power consumption. Specifically, at gain levels 1~15 shown in FIG. 3, the second TX FE slice 110_0 is disabled. Furthermore, at gain levels 6~8, 4 of the first TX FE slices 110_1~110_8 are disabled; at gain levels 9~10, 6 of the first TX FE slices 110_1~110_8 are disabled; at gain levels 11~15, 7 of the first TX FE slices 110_1~110_8 are disabled; at gain levels 16~19, all the 8 first TX FE slices 110_1~110_8 are disabled. Therefore, unlike the unsliced TX FE 400, which has no slice to turn off and hence cannot reduce much power consumption even at a low output power, the sliced TX FE 100 can lower down its power consumption gradually with its output power level. This characteristic is valuable especially when the sliced TX FE 100 is included in a portable electronic device powered by a battery.

Because the number of enabled slices of the sliced TX FE 100 can change with the output power level, the equivalent load imposed by the sliced TX FE 100 upon the filters 22 and 24 will also change with the output power. This variable load may cause the levels of analog signals coming out from the filters 22 and 24 to change as well. The digital circuit of the transmitter/transceiver can adjust the digital signals it outputs to the DACs 12 and 14 in order to nullify the aforementioned level variation.

Figure 5:
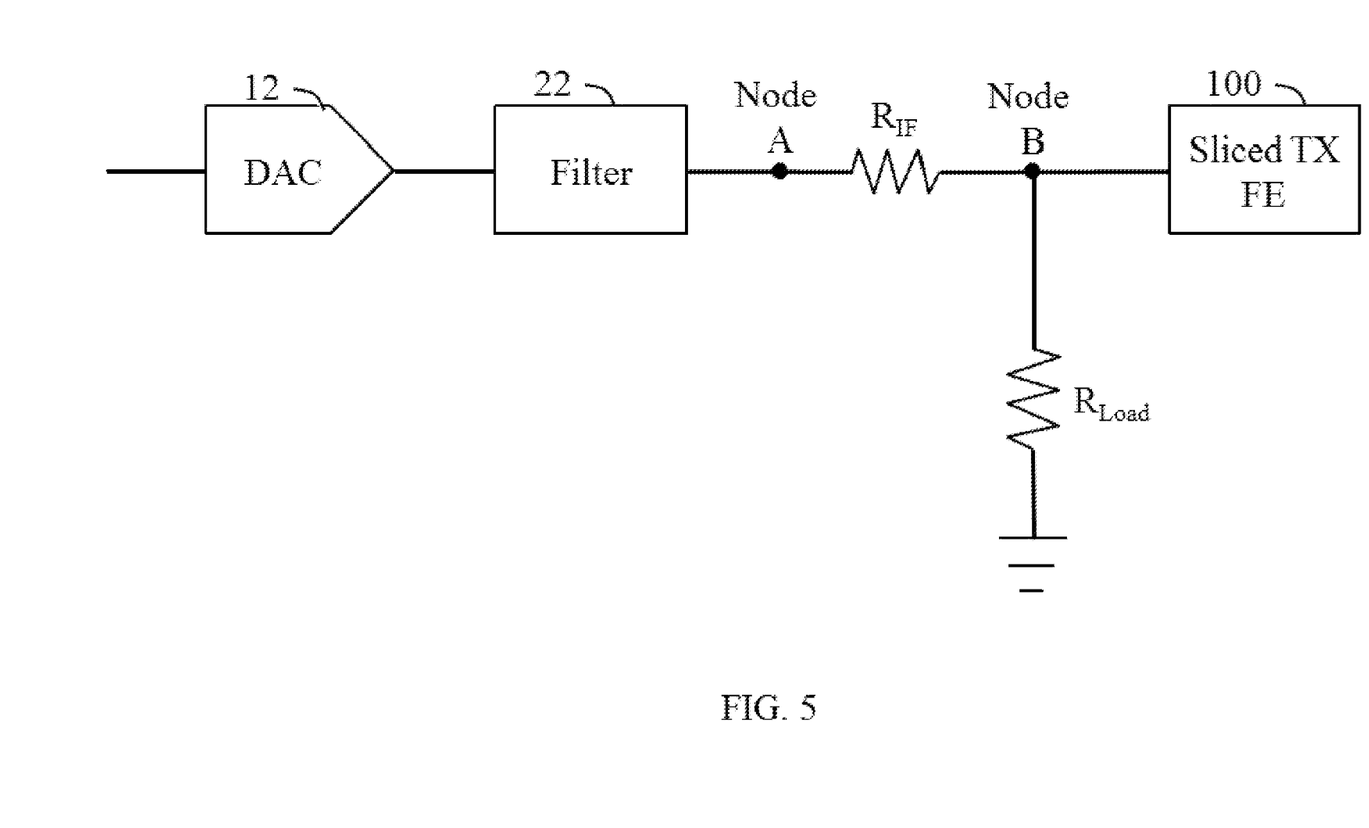
FIG. 5 shows an equivalent circuit modeling the load faced by one of the filters shown in FIG. 1.

FIG. 5 shows an equivalent circuit modeling the filter 22's load. Because there may 1, 2, 4, or 8 TX FE slices being enabled, the equivalent resistances $R_{IF}$ and Road may be variables. For example, the equivalent resistance $R_{Load}$ may be equal to $R_{Load\_8}$ when 8 of the first TX FE slices 110_1~110_8 are enabled, be equal to $R_{Load\_4}$ when only 4 of the first TX FE slices 110_1~110_8 are enabled, be equal to $R_{Load\_2}$ when only 2 of the first TX FE slices 110_1~110_8 are enabled, be equal to $R_{Load\_1}$ when only 1 of the first TX FE slices 110_1~110_8 or only the second TX FE slice 110_0 is enabled. To ensure that a same digital value received by the DAC 12 may result in a same voltage $V_B$ on node B, regardless of how many TX FE slices are enabled, voltage $V_A$ on node A may be adjusted to make the following equations work:

$$V_B = [R_{Load\_8} / (R_{Load\_8} + R_{IF})] \times V_{A\_8}$$
$$= [R_{Load\_4} / (R_{Load\_4} + R_{IF})] \times V_{A\_4}$$
$$= [R_{Load\_2} / (R_{Load\_2} + R_{IF})] \times V_{A\_2}$$
$$= [R_{Load\_1} / (R_{Load\_1} + R_{IF})] \times V_{A\_1}$$

In the equations, $V_{A\_1}$, $V_{A\_2}$, $V_{A\_4}$, and $V_{A\_8}$ are the adjusted voltages on node A when there are 1, 2, 4, and 8 TX FE slices enabled, respectively. This adjustment may be done in the digital domain, e.g. by adding a bass boost gain (GBB) in front of the DAC 12.

Figure 6:
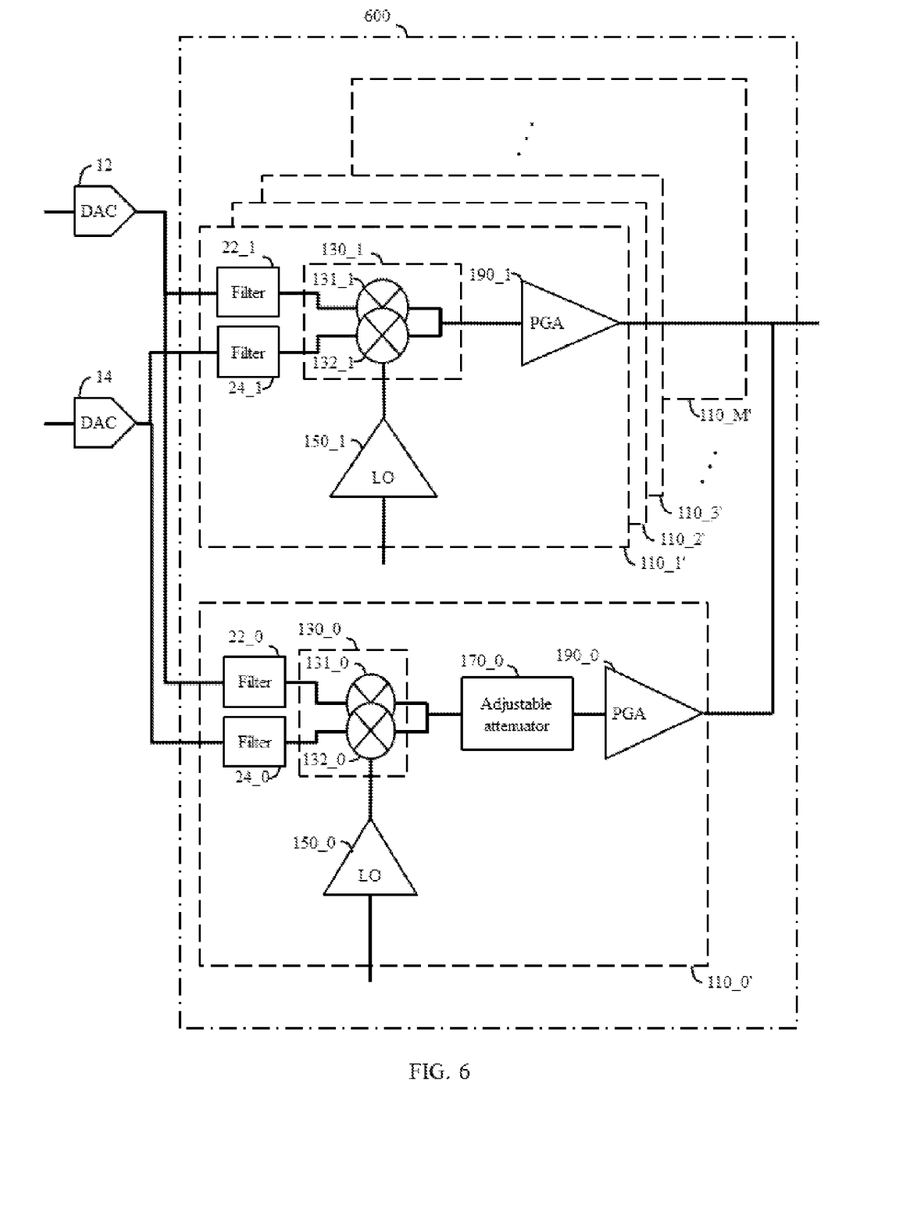
FIGS. 6, 7, and 8 show simplified block diagrams of sliced TX FEs according to three other embodiments of the invention.

FIG. 6 shows a simplified block diagram of a sliced TX FE 600 according to an embodiment of the invention. The sliced TX FE 600 and the sliced TX FE 100 are different in that the latter has unsliced filters 22 and 24 but the former has sliced filters 22_1~22_M and 24_1~24_M in its first TX FE slices 110_1'~110_M' and sliced filters 22_0 and 24_0 in its second TX FE slice 110_0'. For example, each of the filters 22_0~22_M and 24_0~24_M may be roughly 1/M of the scale of the filters 22 and 24. Except for the difference, the sliced TX FE 600 has many of the advantages of the sliced TX FE 100 and may also provide the 19 gain levels shown in FIG. 3.

Figure 7:
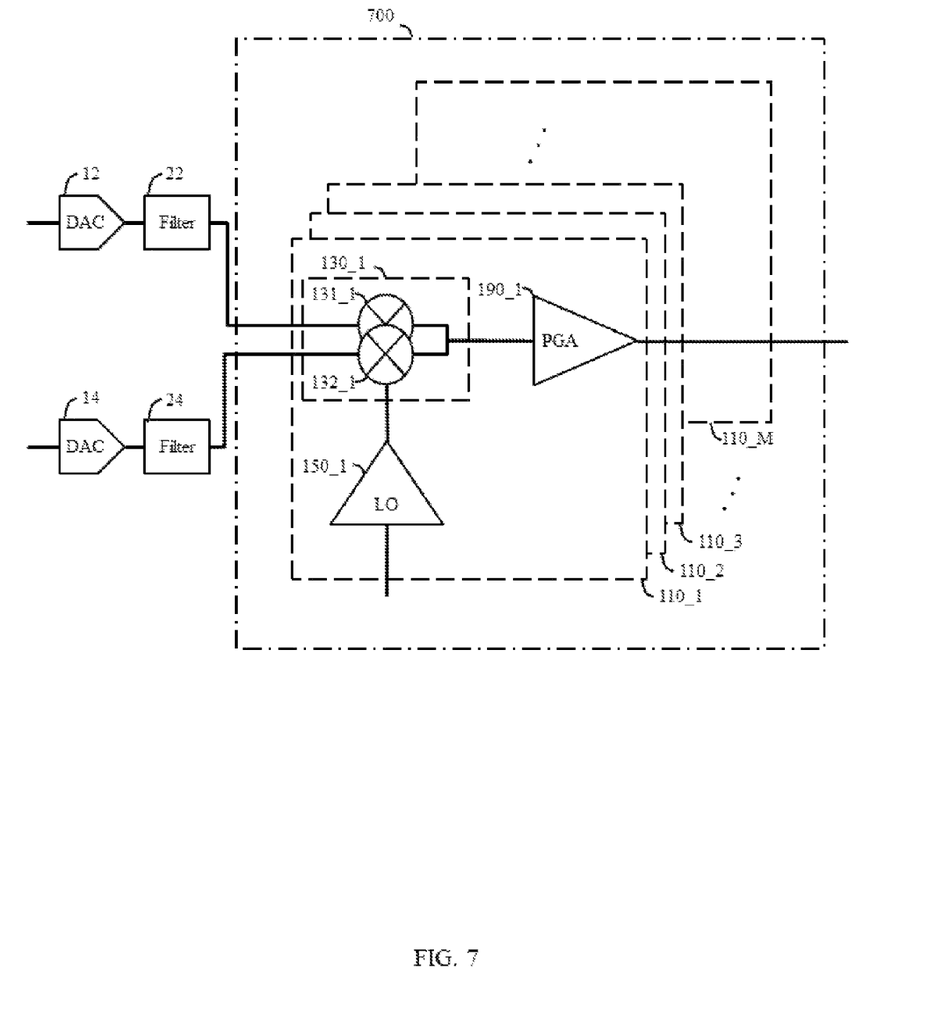

FIG. 7 shows a simplified block diagram of a sliced TX FE 700 according to an embodiment of the invention. This sliced TX FE 700 is different from the sliced TX FE 100 in that the former does not include the second TX FE slice 110_0. Except for having a narrower dynamic range than the sliced TX FE 100, the sliced TX FE 700 has many of the advantages of the sliced TX FE 100 and may also provide the gain levels 1~15 shown in FIG. 3.

Figure 8:
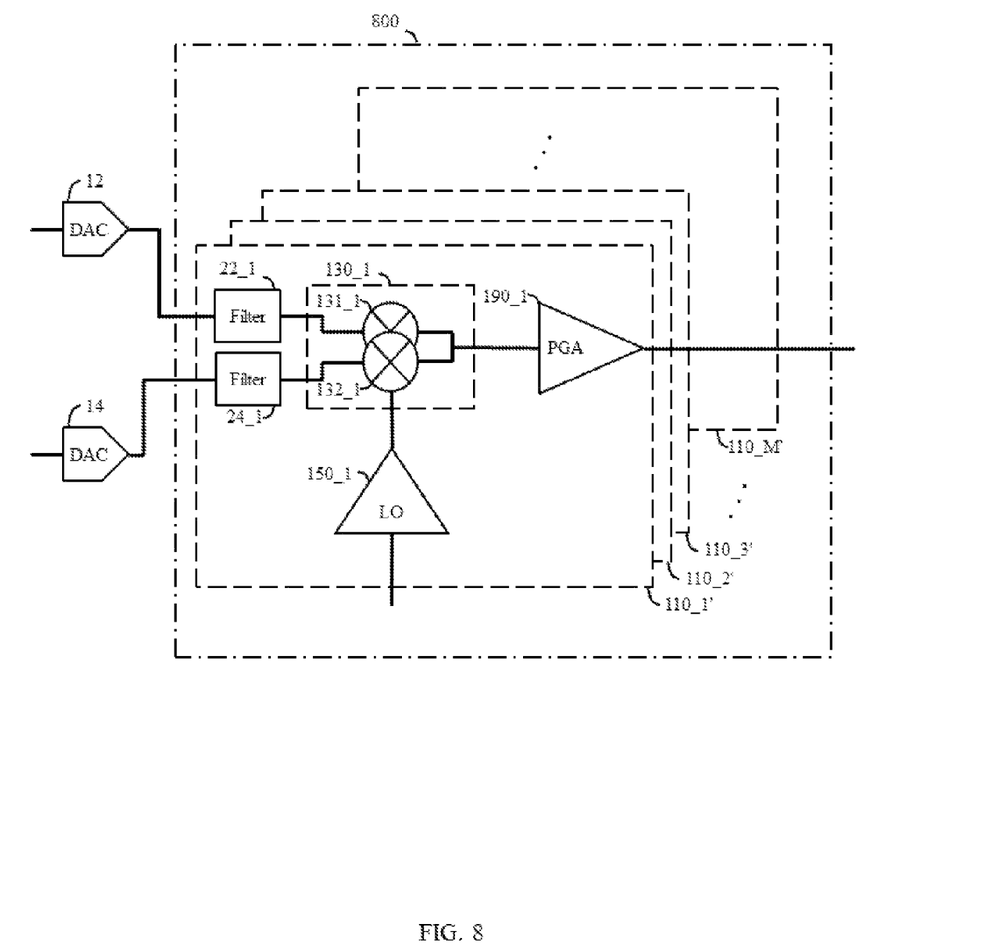

FIG. 8 shows a simplified block diagram of a sliced TX FE 800 according to an embodiment of the invention. This sliced TX FE 800 is different from the sliced TX FE 600 in that the former does not include the second TX FE slice 110_0'. Except for having a narrower dynamic range than the sliced TX FE 600, the sliced TX FE 800 has many of the advantages of the sliced TX FE 600 and may also provide the gain levels 1~15 shown in FIG. 3.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A sliced transmitter front-end (TX FE), comprising:
a plurality of first TX FE slices connected in parallel, as a whole the first TX FE slices contributing a high-gain section to a superimposed gain range of the sliced TX FE; and
a second TX FE slice connected in parallel with the first TX FE slices, the second TX FE slice having a gain range that constitutes a low-gain section of the superimposed gain range of the sliced TX FE;
wherein a minimum gain of the gain range of the second TX FE slice is smaller than a minimum gain of the high-gain section.

2. The sliced TX FE of claim 1, wherein the second TX FE slice comprises an adjustable attenuator, and none of the first TX FE slices comprises an adjustable attenuator.

3. The sliced TX FE of claim 1, wherein the second TX FE slice is different from the first TX FE slices at least in that the second TX FE slice comprises an adjustable attenuator.

4. The sliced TX FE of claim 1, wherein each of the first TX FE slices comprises a single gain stage consisting of a programmable gain amplifier (PGA), and the second TX FE slice comprises two gain stages consisting of an adjustable attenuator and a PGA.

5. The sliced TX FE of claim 1, wherein:
   each of the first TX FE slices comprises:
      a first mixer; and
      a first PGA, connected to a signal output end of the first mixer and comprising a plurality of PGA units; and
   the second TX FE slice comprises:
      a second mixer;
      an adjustable attenuator, connected to a signal output end of the second mixer; and
      a second PGA, connected to a signal output end of the adjustable attenuator and comprising a plurality of PGA units.

6. The sliced TX FE of claim 5, wherein each of the first TX FE slices further comprises a first filter connected to a signal input end of the first mixer of the first TX FE slice, and the second TX FE slice further comprises a second filter connected to a signal input end of the second mixer.

* * * * *